＃US011221057B2

United States Patent
Aihara et al.

(10) Patent No.: US 11,221,057 B2
(45) Date of Patent: Jan. 11, 2022

(54) CORD LOCK

(71) Applicant: NIKE, Inc., Beaverton, OR (US)

(72) Inventors: Yuki Aihara, Portland, OR (US); Kevin C. Sze, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 71 days.

(21) Appl. No.: 16/303,622

(22) PCT Filed: May 26, 2017

(86) PCT No.: PCT/US2017/034739
§ 371 (c)(1),
(2) Date: Nov. 20, 2018

(87) PCT Pub. No.: WO2017/210121
PCT Pub. Date: Dec. 7, 2017

(65) Prior Publication Data
US 2020/0318712 A1    Oct. 8, 2020

Related U.S. Application Data

(60) Provisional application No. 62/343,529, filed on May 31, 2016.

(51) Int. Cl.
*F16G 11/10* (2006.01)
*A43C 7/00* (2006.01)
(Continued)

(52) U.S. Cl.
CPC ............. *F16G 11/101* (2013.01); *A41D 1/04* (2013.01); *A41D 1/06* (2013.01); *A43C 7/00* (2013.01);
(Continued)

(58) Field of Classification Search
CPC .. A43C 7/08; A43C 7/00; B65D 33/28; A41D 2200/20; A41D 2300/33; F16G 11/101
(Continued)

(56) References Cited

U.S. PATENT DOCUMENTS

| 560,683 A | 5/1896 | Bruckner |
| 3,696,474 A | 10/1972 | Slauta |

(Continued)

FOREIGN PATENT DOCUMENTS

| CN | 2139781 Y | 8/1993 |
| CN | 201180763 Y | 1/2009 |

(Continued)

OTHER PUBLICATIONS

International Preliminary Report on Patentability dated Dec. 13, 2018 in International Patent Application No. PCT/US2017/034739, 10 pages.
(Continued)

*Primary Examiner* — Alissa L Hoey
(74) *Attorney, Agent, or Firm* — Shook, Hardy & Bacon, L.L.P.

(57) ABSTRACT

A cord-lock assembly for slidably adjusting a length of cord is provided. The assembly may include various components such as a cord, a cord lock, and an article layer into which the cord lock and cord may be at least partially integrated. The cord lock may include one or more components that releasably clamp onto the cord and engage the cord through resistance provided by a biasing element. The cord-lock assembly may be configured such that a force applied to the cord lock in axial alignment with an aperture in which the cord lock is positioned allows adjustment of a length of cord extending through the cord lock and/or through the aperture layer.

20 Claims, 9 Drawing Sheets

(51) Int. Cl.
  *B65D 33/28*  (2006.01)
  *A41D 1/04*   (2006.01)
  *A41D 1/06*   (2006.01)

(52) U.S. Cl.
  CPC .......... *B65D 33/28* (2013.01); *A41D 2200/20* (2013.01); *A41D 2300/33* (2013.01)

(58) Field of Classification Search
  USPC .............................................................. 2/84
  See application file for complete search history.

(56) References Cited

U.S. PATENT DOCUMENTS

| | | | |
|---|---|---|---|
| 4,453,292 A * | 6/1984 | Bakker | F16G 11/101 24/115 G |
| 4,646,394 A | 3/1987 | Krauss | |
| 4,769,874 A | 9/1988 | Tracy | |
| 5,012,598 A * | 5/1991 | Baggio | A43B 5/0449 36/117.8 |
| 5,182,838 A | 2/1993 | Stenner | |
| 5,263,202 A | 11/1993 | Siberell | |
| 5,299,323 A | 4/1994 | Schaefer et al. | |
| 5,323,514 A * | 6/1994 | Masuda | F16G 11/101 24/115 G |
| 5,361,461 A * | 11/1994 | Anscher | F16G 11/101 24/115 G |
| 5,365,641 A * | 11/1994 | Watanabe | A45C 13/1046 24/115 G |
| 5,611,118 A * | 3/1997 | Bibbee | A42B 7/00 2/195.1 |
| 5,903,959 A * | 5/1999 | Leonardi | F16G 11/101 24/712.1 |
| 6,317,894 B1 | 11/2001 | Blechman | |
| 6,618,863 B2 | 9/2003 | Blechman | |
| 6,658,704 B2 | 12/2003 | Buscart | |
| 7,254,871 B2 | 8/2007 | Yoshiguchi | |
| 7,415,750 B2 * | 8/2008 | Kinebuchi | F16G 11/101 24/115 G |
| 8,132,298 B2 * | 3/2012 | Chan | F16G 11/101 24/115 G |
| 8,181,320 B2 * | 5/2012 | Wolfberg | A43C 7/08 24/712.5 |
| 8,209,822 B2 | 7/2012 | Okot | |
| 8,281,413 B2 | 10/2012 | Ly | |
| 8,997,314 B2 * | 4/2015 | Kawaguchi | F16G 11/101 24/115 G |
| 10,212,973 B2 * | 2/2019 | Betts | A45C 13/10 |
| 2001/0031104 A1 * | 10/2001 | Vazquez | A45C 7/0063 383/2 |
| 2003/0121126 A1 | 7/2003 | Buscart | |
| 2004/0055069 A1 | 3/2004 | Fayle et al. | |
| 2004/0148742 A1 | 8/2004 | Berns | |
| 2004/0221433 A1 * | 11/2004 | Wolfberg | A43B 23/24 24/712.5 |
| 2005/0268436 A1 | 12/2005 | Yoshiguchi | |
| 2006/0085952 A1 * | 4/2006 | Kaneko | F16G 11/101 24/3.1 |
| 2006/0196022 A1 * | 9/2006 | Okot | A41F 1/00 24/712.5 |
| 2007/0017008 A1 | 1/2007 | Snedeker et al. | |
| 2007/0289061 A1 * | 12/2007 | Dumoulin | A47G 9/064 5/417 |
| 2008/0115334 A1 | 5/2008 | Chen et al. | |
| 2010/0177992 A1 * | 7/2010 | Hawbaker | B65D 33/28 383/117 |
| 2011/0185476 A1 * | 8/2011 | Boisseau | A45C 13/1046 2/243.1 |
| 2012/0042498 A1 | 2/2012 | Kuo-An | |
| 2012/0047620 A1 * | 3/2012 | Ellis | A41D 27/00 2/69 |
| 2012/0311768 A1 | 12/2012 | Ladyzhenskaya et al. | |
| 2014/0317829 A1 * | 10/2014 | Rolfe | A42B 1/048 2/84 |
| 2015/0007423 A1 | 1/2015 | Yang | |
| 2015/0096158 A1 * | 4/2015 | Shattuck | A43C 7/00 24/712.1 |
| 2015/0181986 A1 * | 7/2015 | Chen | F16G 11/101 24/595.1 |
| 2017/0049189 A1 * | 2/2017 | Aihara | F16G 11/101 |
| 2018/0058543 A1 * | 3/2018 | Sze | F16G 11/101 |
| 2018/0062318 A1 * | 3/2018 | Sze | A45C 13/1046 |

FOREIGN PATENT DOCUMENTS

| | | |
|---|---|---|
| CN | 201727315 U | 2/2011 |
| CN | 204483330 U | 7/2015 |
| CN | 205093331 U | 3/2016 |
| EP | 1654941 A3 | 5/2008 |
| FR | 2925261 A1 | 6/2009 |
| GB | 2118618 A | 11/1983 |
| GN | 102996711 B | 12/2016 |
| JP | 10257907 A | 9/1998 |
| WO | 0230223 A1 | 4/2002 |

OTHER PUBLICATIONS

Extended European Search Report received for European Patent Application No. 20164101.6, dated Jul. 2, 2020, 6 pages.
International Search Report and Written Opinion dated Aug. 28, 2017 in International Patent Application No. PCT/US2017/034739.
Communication under Rule 71(3) dated Nov. 29, 2019 in European Patent Application No. 17728974.1, 34 pages.
Intention to Grant received for European Patent Application No. 20164101.6, dated Jul. 27, 2021, 7 pages.

* cited by examiner

CORD LOCK

CROSS-REFERENCE TO RELATED APPLICATIONS AND CLAIM OF PRIORITY

This Non-Provisional Patent Application claims priority to co-pending PCT Application No. PCT/US2017/034739, filed May 26, 2017, and titled "Cord Lock," and also to U.S. Provisional Patent Application No. 62/343,529, filed May 31, 2016, and titled "Cord Lock." The contents of each of these priority applications is incorporated herein by reference in the entirety.

BACKGROUND OF THE INVENTION

Drawcords or just "cords" (also sometimes referred to as laces, cables, drawstrings, and the like) are commonly integrated into various types of articles (e.g., bags, garments, etc.) to modify a feature of the article, such as size, dimension, or shape. Cord locks provide a mechanism to adjust, and set, a length of the cord. Sometimes the cord lock is only attached to the cord, and not to the article itself, which can result in the cord lock being lost or misplaced if the cord lock is disconnected from the cord. In addition, a cord lock that is only attached to the cord may be flung about by the cord, which can be undesirable even if only to a small degree.

BRIEF DESCRIPTION OF THE DRAWING

Aspects of the present disclosure are described in detail with reference to the figures, which are incorporated herein by reference and which are intended to be exemplary and non-limiting in nature, wherein.

DETAILED DESCRIPTION OF THE INVENTION

The subject matter of various aspects of the present disclosure is described with specificity herein to meet statutory requirements. However, the description itself is not intended to limit the scope of the invention. Rather, the claimed subject matter may be embodied or carried out in other ways, to include different elements, combinations, components, configurations, and/or steps, including those similar to the ones described in this disclosure, in conjunction with other present or future technologies.

Aspects of the present disclosure relate generally to cord locks and cord-lock assemblies/systems. An exemplary cord-lock assembly may include a cord, a cord lock, and an article layer that are integrated with each other to provide a semi-concealed cord lock that can be used for adjusting a length of cord extending through or from the article layer. The cord may be slidably adjustable through the cord lock in response to an application of a force to the cord lock, allowing the length of cord extending through the article layer to be adjusted.

In a first aspect, a cord-lock assembly is provided. The cord-lock assembly comprises a cord lock having a first portion, a second portion, and a biasing element coupled between the first portion and the second portion. The first portion includes a first through-channel, and the second portion includes a second through-channel that is alignable with the first through-channel. The biasing element provides a force in a first direction to misalign the first through-channel and the second through-channel. The cord-lock assembly further comprises an article layer having a first aperture, which is bounded by an aperture collar that forms a perimeter around the first aperture. At least part of the first portion is positioned in the first aperture and is circumscribed by the aperture collar, and the first direction of the force is axially aligned with the first aperture.

In a second aspect, a cord-lock system is provided. The cord-lock system comprises a cord lock including a housing having one or more sidewalls at least partially enclosing a plunger-receiving space. The one or more sidewalls include a first through-channel, a plunger having a second through-channel that is alignable with the first through-channel when the plunger is at least partially received in the plunger-receiving space, and a biasing element coupled between the housing and the plunger. The biasing element provides a force in a first direction to misalign the first through-channel and the second through-channel. The system further includes an article layer having an aperture bounded by an aperture collar, the aperture collar forming a perimeter around the aperture. The plunger is positioned within the aperture and is coupled to the aperture collar. The first direction of the force is axially aligned with the first aperture.

In a third aspect, an article is provided. The article comprises an article layer forming a tubular encasing. The article layer has a first aperture and a second aperture, and a cord lock at least partially enclosed within the tubular encasing. The cord lock includes a first portion at least partially extending through the first aperture, a second portion, and a biasing element coupled between the first portion and the second portion. The first portion includes a first through-channel, and the second portion includes a second through-channel that is alignable with the first through-channel. The biasing element provides a force in a first direction to misalign the first through-channel and the second through-channel. The first direction is axially aligned with the first aperture through which the first portion at least partially extends. The article further comprises a cord positioned through the first through-channel, the second through-channel, and the second aperture.

A "cord" as used herein includes, but is not limited to, a string, strand, fiber, cord, rope, yarn, thread, strap, ribbon, lace, band, and the like. A cord may be comprised of multiple filaments or a monofilament. A band may be wound, braided, knit, woven, spun, cut, and the like. In an exemplary aspect, a cord is an element used in connection with apparel, footwear, equipment, and the like to secure, tighten, constrict, wrap, or otherwise exert a tension force about an element (e.g., a wearer or an article). Specifically, it is contemplated that a cord, cord lock, and/or cord-lock assembly may be used in connection with a shirt, a jacket, a pant, a pair of shorts, an article of footwear, an article of outerwear (e.g., gloves, mittens, hat, rain gear, winter gear), swim wear, bags, outdoor gear (e.g., a tent, a sleeping bag, etc.) and the like. The above-listed use considerations are intended to be exemplary and non-limiting in nature, and other uses are contemplated.

A "biasing element" as used herein may comprise one or more springs, cushions, and/or other elastic or elastically resilient components that provide a biasing force between movable parts of a cord lock. A biasing element may also include a pair of magnets in which the same poles are oriented towards each other (e.g., a first magnet with a first north pole and first south pole and a second magnet with a second north pole and a second south pole, where either the first and second north poles or the first and second south poles are oriented towards each other to provide a repelling force that acts as a biasing force). Additionally, a "cord lock" as used herein may comprise one or more components, at least some of which are moveable relative to each other for releasably clamping onto a cord to restrict movement of the cord through the cord lock.

Figure 1A:
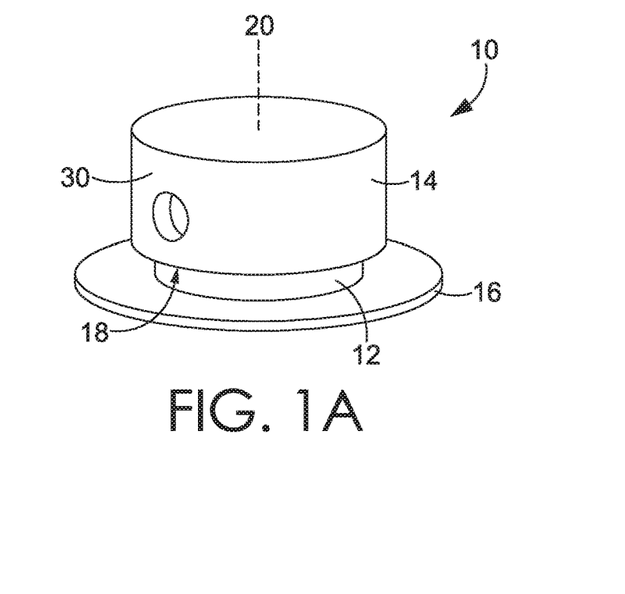
FIG. 1A depicts a perspective view of a cord lock, in accordance with an aspect hereof.

Referring to FIG. 1A, an exemplary cord lock 10 for a cord-lock assembly is provided, in accordance with an aspect hereof. In FIG. 1A, the cord lock 10 includes a plunger 12, a housing 14, and a cap 16 coupled to the plunger 12. The housing 14 includes one or more sidewalls 30 that form a plunger-receiving space 18 within the sidewalls 30, the plunger 12 at least partially received within the plunger-receiving space 18. The plunger 12 and the housing 14 may be movable relative to each other along an axis 20 of the cord lock 10, allowing components of the cord lock 10 to adjustably clamp onto a cord. The cord lock 10 shown in FIG. 1A may also be integrated into a cord-lock assembly, as described in greater detail with reference to FIGS. 3-10 below.

Figure 1B:
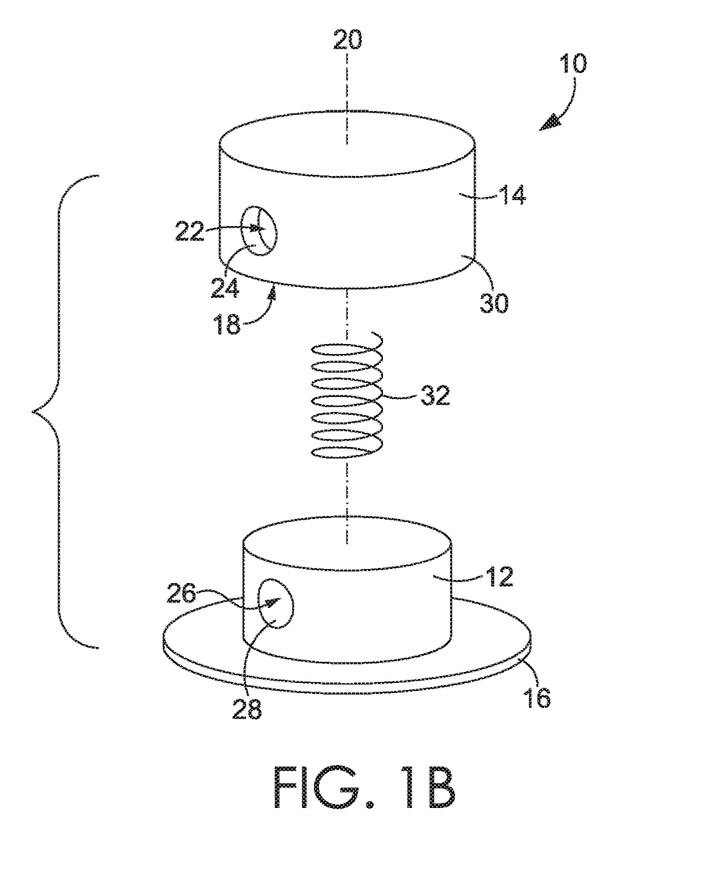
FIG. 1B depicts an exploded view of the cord lock of FIG. 1A, in accordance with an aspect hereof.

Referring to FIG. 1B, an exploded view of the cord lock 10 shown in FIG. 1A is provided, in accordance with an aspect hereof. As shown in FIG. 1B, the housing 14 includes at least one opening 22 forming part of a first through-channel 24 extending through the housing 14, and the plunger 12 includes at least one opening 26 forming part of a second through-channel 28 extending through the plunger 12, the first and second through-channels 24, 28 being alignable (see FIGS. 4A-4B for greater detail of the openings 22, 26 and the through-channels 24, 28). The housing 14 further includes the one or more sidewalls 30 that form the plunger-receiving space 18 for receiving at least a portion of the plunger 12, as shown in FIG. 1A. A biasing element 32 is coupled between the plunger 12 and the housing 14, and provides a biasing force to actively misalign or dealign the first and second through-channels 24, 28 by biasing the plunger 12 and the housing 14 apart along the axis 20 of the cord lock 10. This misalignment may be used to increase friction/resistance on a cord positioned in the first and second through-channels 24, 28, to restrict movement of the cord therein.

When the plunger 12 is received in the plunger-receiving space 18, and adjustment of a length of cord extending through the cord lock 10 is desired, a force may be applied to the cord lock 10 along the axis 20 of the cord lock 10 to counteract the force from the biasing element 32. As a result, the plunger 12 and the housing 14 move towards each other, which in turn, moves the first and second through-channels 24, 28 towards alignment, reducing restriction on the cord and allowing the length of cord extending through the cord lock 10 to be adjusted. Upon removal of the force that counteracts the force of the biasing element 32, the plunger 12 and the housing 14 may once again move apart, dealigning the through-channels 24, 28 and increasing restriction on the cord to help maintain the position of the cord in the through-channels 24, 28.

It should be noted that although it is depicted as cylindrical, the housing 14 and/or the sidewalls 30 of the cord lock 10 may take any shape or configuration (e.g., circular, square, triangular, rectangular, hexagonal, trapezoidal, various prisms, etc.). The sidewall(s) 30 may be one continuous wall or multiple independently defined walls, in various aspects. In exemplary aspects, the housing 14 and the sidewalls 30 may be configured to allow for moveable engagement with the plunger 12, such as slideable engagement. As such, it is contemplated that components of the cord lock 10 may have a number of configurations, shapes, and sizes while still achieving the aspects provided herein.

Figure 2A:
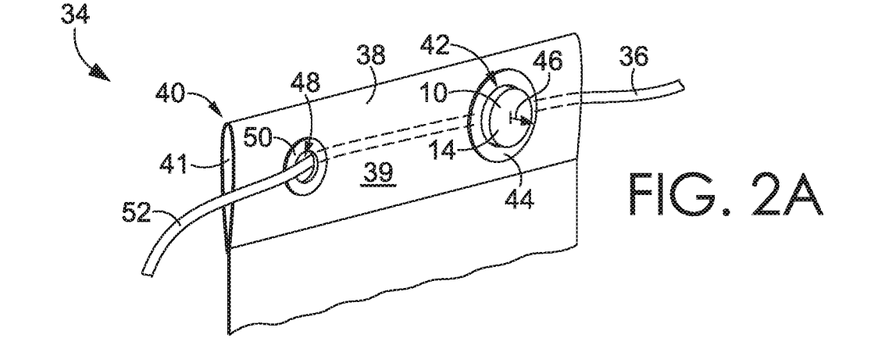
FIG. 2A depicts an angled perspective view of a cord-lock assembly, in accordance with an aspect hereof.

Referring to FIG. 2A, an angled perspective view of an exemplary cord lock assembly 34 incorporating the cord lock 10 shown in FIGS. 1A-1B is provided, in accordance with an aspect hereof. The assembly 34 includes a cord 36, the cord lock 10, and an article layer 38 having first and second apertures 42, 48. The cord 36 extends through the cord lock 10 and through the article layer 38. The article layer 38 is arranged to form a tubular encasing 40 that at least partially encloses a void or space in which at least some components of the cord lock 10 are housed. In this sense, the article layer 38 includes an outward-facing surface 39 that faces away from the enclosed space and an inward-facing surface 41 that faces towards the enclosed space. The article layer 38 might be a single piece of textile that is folded over onto itself and affixed to form the tubular encasing 40. In addition, the article layer 38 might actually be two or more pieces of textile that are coupled to one another into a tubular structure to form the tubular encasing 40.

In an aspect of the disclosure, when the cord lock 10 is at least partially housed in the space within the tubular encasing 40, then the article layer 38 at least partially obscures some components of the cord lock 10 (to at least partially conceal and possibly protect the components) when viewed from the perspective of the outward-facing surface 39. The assembly 34 of FIG. 2A also allows integration of the cord lock 10 into a seam, cuff, border, trim piece, or other portion of an article or piece of equipment.

The first aperture 42 of the article layer 38 is bounded by a first aperture collar 44 that forms a perimeter around the first aperture 42. The second aperture 48 of the article layer 38 is bounded by a second aperture collar 50 that forms a perimeter around the second aperture 48. The aperture collars 44, 50 may further comprise grommets that are fixedly coupled to the respective aperture collars 44, 50. However, in aspects, at least some aperture collars may not include grommets, such that the aperture collar includes the terminal portion or edge of the article layer that forms a boundary around the respective aperture. As shown in FIG. 2A, at least a portion of the cord lock 10 is positioned in the first aperture 42, or rather extends into and/or at least partially through the first aperture 42. In the aspect depicted in FIGS. 2A-2B, this portion is the housing 14, but in alternate aspects, the portion may be the plunger 12, or a combination of the housing 14 and the plunger 12. The aperture collars 44, 50 may engage the cord lock 10 in a number of ways (e.g., frictional engagement, bonding, male-female coupling, etc.), as discussed in greater detail with respect to FIGS. 7A-7C.

In FIG. 2A, the housing 14 is movable relative to the plunger 12 along an axis 46 of the first aperture 42 (which is in alignment with the axis 20 of the cord lock 10 shown in FIGS. 1A-1B). In other words, the housing 14 and the plunger 12 are movable relative to each other perpendicular to a plane formed across the first aperture 42. This may allow alignment or dealignment of the through-channels 24, 28 of the cord lock 10, depending on the direction of the movement. In FIG. 2A, the cord 36 extends through the enclosed space of the tubular encasing 40, through the cord lock 10, and through the second aperture 48 to expose a length 52 of the cord 36 outside of the tubular encasing 40. The length 52 of the cord 36 may be adjusted (e.g., to restrict a size of an opening of a bag or hood) upon application of a force along the axis 46 to move the housing 14 and the plunger 12 together.

Figure 2B:
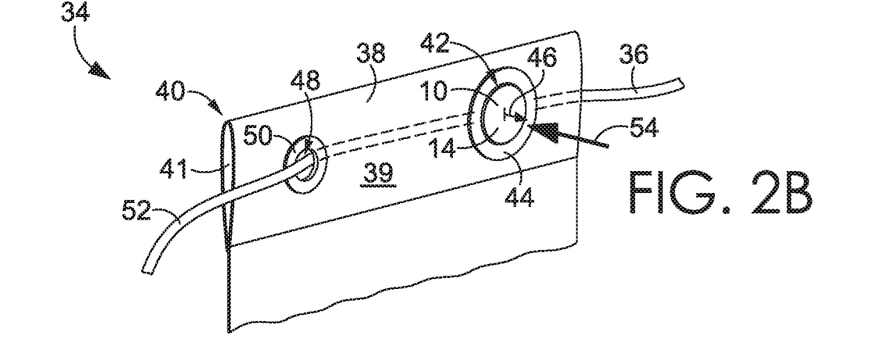
FIG. 2B depicts the cord-lock assembly of FIG. 2A with a force applied, in accordance with an aspect hereof.

Referring to FIG. 2B, the cord-lock assembly 34 of FIG. 2A, with a force 54 applied to the cord lock 10, is provided, in accordance with an aspect hereof. As discussed with respect to the cord lock 10 in FIG. 2A, the cord 36 may be slidably adjusted through the cord lock 10 and through the enclosed space of the tubular encasing 40, by applying the force 54 to the cord lock 10 to counteract the force of the biasing element 32, moving the first and second through-channels 24, 28 towards alignment and reducing restriction on the cord 36. The length 52 of the cord 36 exposed outside the article layer 38 may subsequently be adjusted by pulling on the length 52 of the cord 36 when the first and second through-channels 24, 28 are moved towards alignment with the force 54.

In one exemplary operation of the assembly 34, a user may squeeze or press the tubular encasing 40 to apply the force 54 to the cord lock 10 along the axis 46 of the first aperture 42, which moves the housing 14 and the plunger 12 together, moving the first and second through-channels 24, 28 towards alignment and reducing restriction on the cord 36. As this occurs, the user may simultaneously pull the length 52 of the cord 36 extending through the second aperture 48 to increase the length 52 of the cord 36 exposed outside of the second aperture 48. The user may then remove the force 54 to misalign the through-channels 24, 28, providing more restriction to the cord 36, to help maintain the position of the cord 36 in the cord lock 10.

Figure 3:
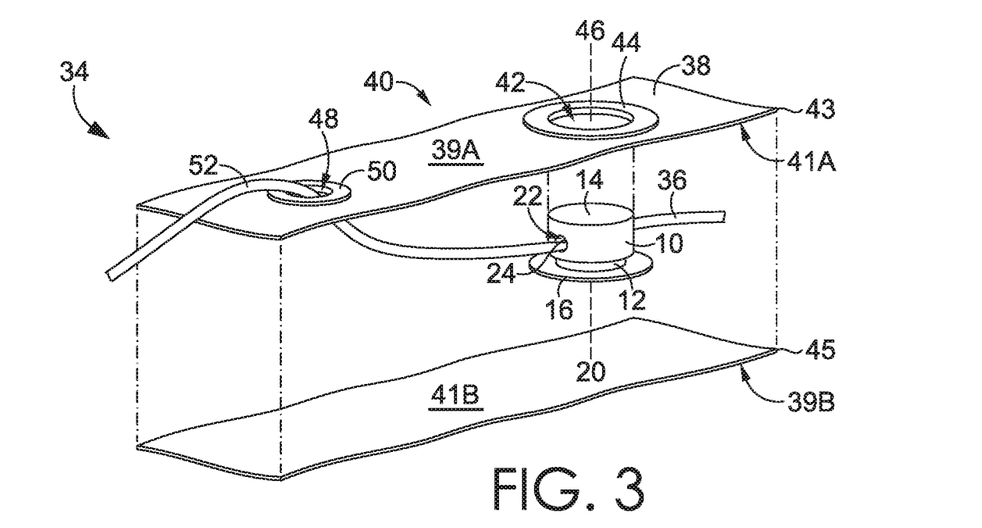
FIG. 3 depicts an exploded view of the cord-lock assembly of FIGS. 2A-2B, in accordance with an aspect hereof.

Referring to FIG. 3, a first side 43 of the tubular encasing 40 is depicted pulled apart from a second side 45 of the tubular encasing 40 to reveal some of the structure housed in the space partially enclosed by the article layer 38. Although the first side 43 and the second side 45 are depicted as being discrete pieces that are disconnected from one another, the first side 43 and the second side 45 might be parts of the same piece of textile that are folded onto one another and affixed to form the tubular casing 40. The first side 43 includes an inward-facing surface 41A (obstructed from view in FIG. 3), and the second side 45 includes an inward-facing surface 41B, the inward-facing surfaces 41A, 41B facing towards one another. In addition, the first side 43 includes an outward-facing surface 39A, and the second side 45 includes an outward-facing surface 39B (obstructed from view in FIG. 3), the outward-facing surfaces 39A, 39B facing away from the inward-facing surfaces 41A and 41B.

In FIG. 3, the cord lock 10 is positioned between the inward-facing surfaces 41A and 41B, such that the inward-facing surfaces 41A and 41B face towards the cord lock 10 and the outward-facing surfaces 39A and 39B face away from the cord lock 10. As such, the cord lock 10 is positioned within the tubular encasing 40 and includes a portion that extends into and/or through the first aperture 42. The plunger 12 is seated within the housing 14 within the space that is enclosed by the tubular casing 40. That is, the plunger 12 is seated within the housing 14 in the space between the inward-facing surfaces 41A and 41B. In addition, when the components are assembled, the housing 14 extends through the first aperture 42, such that it is at least partially located external to the tubular casing 40 and external to the space between the inward-facing surfaces 41A and 41B. The plunger 12 and the housing 14 in FIG. 3 are movable relative to each other along the axis 20 of the cord lock 10, and simultaneously, along the axis 46 of the first aperture 42, as discussed herein.

Figure 4A:
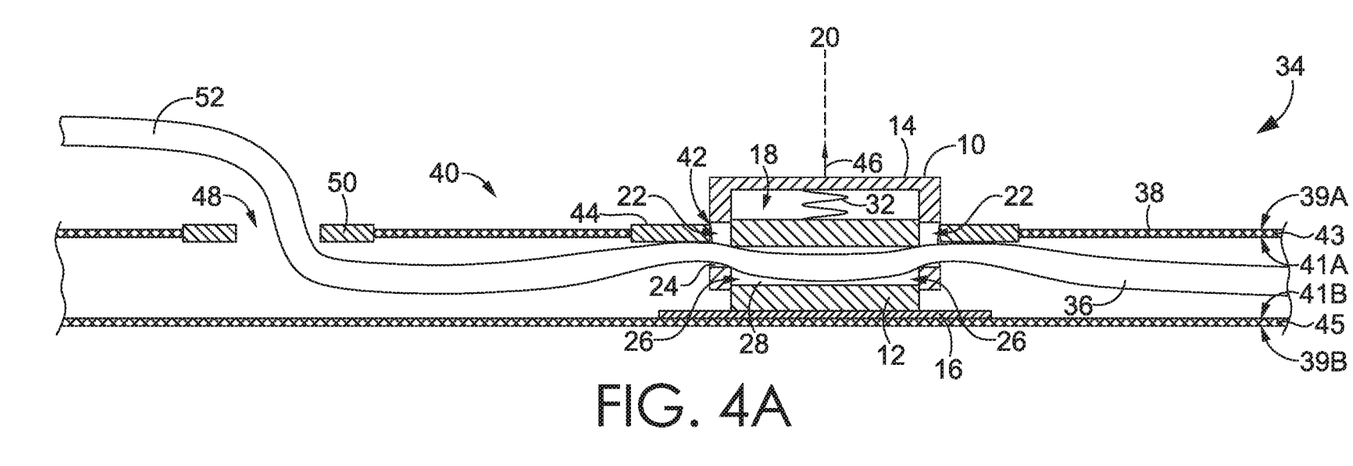
FIG. 4A depicts a cross-section view of the cord-lock assembly of FIGS. 2A-2B, in accordance with an aspect hereof.

Referring to FIG. 4A, a cross-section view of the cord-lock assembly 34 shown in FIGS. 2A-2B is provided, in accordance with an aspect hereof. The cord lock 10 is shown between the first side 43 and the second side 45 and in the space between the inward-facing surfaces 41A and 41B. As such, the cord lock 10 is at least partially concealed by the article layer 38 when viewed from a position external to the tubular encasing 40. The plunger 12 is movably seated within the housing 14 in the space between the first side 43 and the second side 45. The cord 36 is positioned in the first and second through-channels 24, 28 (i.e., threaded through the first and second through-channels 24, 28 of the cord lock 10). The biasing element 32 is applying a force to actively dealign or misalign the first and second through-channels 24, 28, increasing friction and/or resistance on the cord 36. The cord 36 extends through the cord lock 10 and through the space between the first side 43 and the second side 45 and out of the second aperture 48, exposing the length 52 of the cord 36. The housing 14 is positioned in the first aperture 42 and is coupled to the first aperture collar 44, and is oriented such that the force of the biasing element 32 is aligned with the axis 46 of the first aperture 42. The first aperture collar 44 may be movably or slidably coupled to the cord lock 10, as shown in FIGS. 4A-4B, or fixedly coupled to the cord lock, in alternate aspects.

Figure 4B:
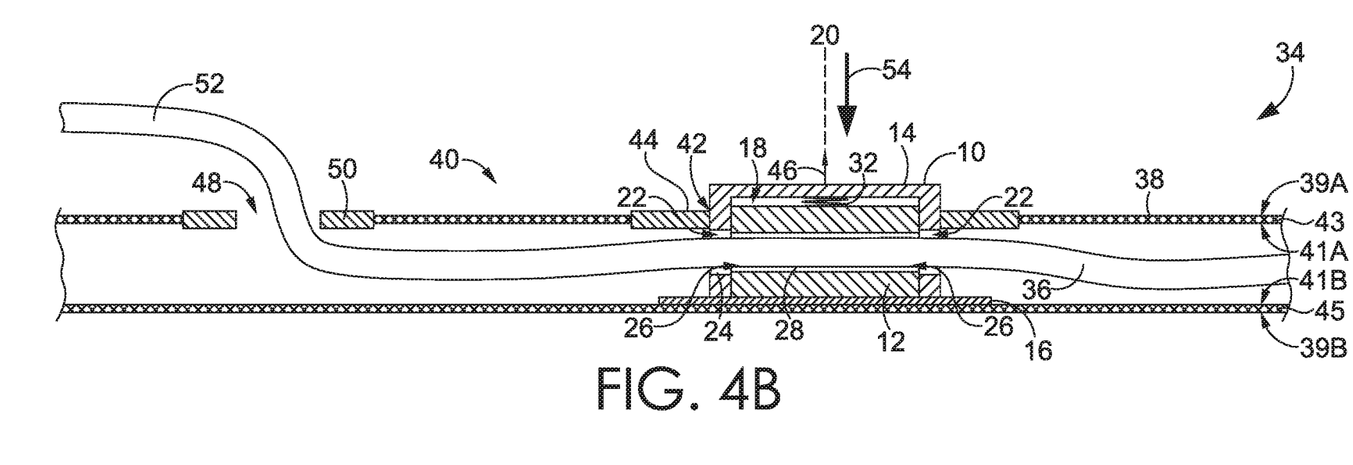
FIG. 4B depicts the cord-lock assembly of FIG. 4A with a force applied, in accordance with an aspect hereof.

Referring now to FIG. 4B, a cross-section view of the cord-lock assembly 34 of FIG. 4A, with the force 54 applied to the cord lock 10, is provided, in accordance with an aspect hereof. In FIG. 4B, the force 54 is applied in a direction that aligns with the axes 20 and 46 (i.e., the direction of the force 54 is substantially parallel with the axes 20 and 46). In this respect, when the force 54 is applied to the cord lock 10, the force 54 counteracts the force provided by the biasing element 32, moving the plunger 12 and the housing 14 towards each other, which in turn moves the first and second through-channels 24, 28 towards alignment. As a result, the length 52 of the cord 36 extending through the second aperture 48 may be adjusted as desired. This manipulation of the cord lock 10 within the article layer 38 allows a button-like actuation of the cord lock 10.

Figure 4C:
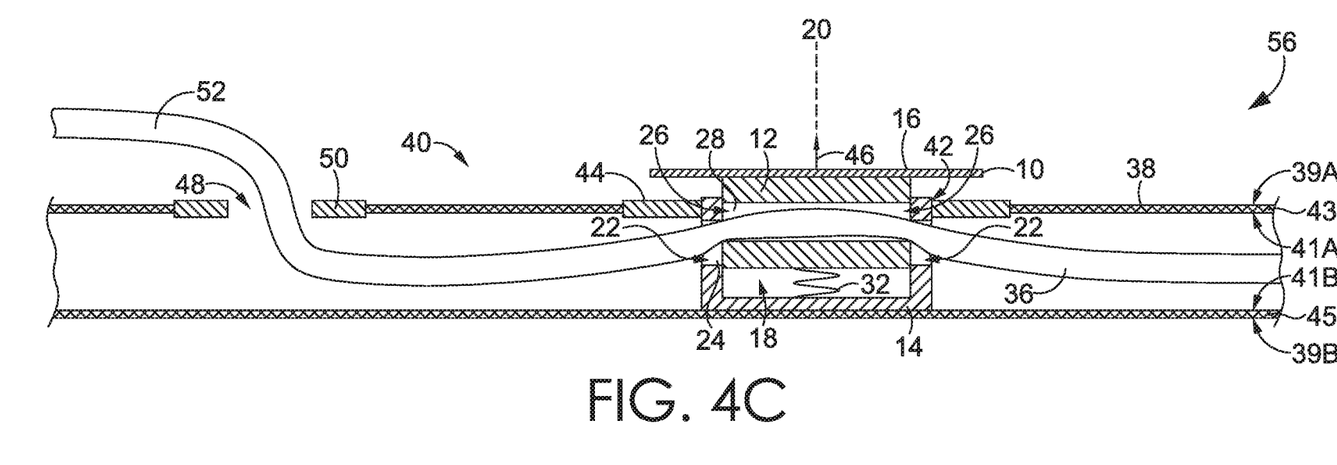
FIG. 4C depicts a cross-section view of an alternative cord-lock assembly configuration, in accordance with an aspect hereof.

Referring to FIG. 4C, a cross-section view of an alternative cord-lock assembly 56 is provided, in accordance with an aspect hereof. In FIG. 4C, many of the elements of the assembly 56 are similar to those of the assembly 34 shown in FIGS. 4A-4B, including the article layer 38 forming a tubular encasing 40 having a first side 43 and a second side 45, inward-facing surfaces 41A and 41B, the cord lock 10 having the plunger 12 and the housing 14, the cord 36, the first aperture 42, the first aperture collar 44, the second aperture 48, and the second aperture collar 50. However, in the assembly 56 shown in FIG. 4C, the plunger 12 and the housing 14 are in a different position/orientation relative to the first aperture 42. More specifically, the orientation of the plunger 12 and the housing 14 is flipped compared to FIGS. 4A-4B, such that the plunger 12 is positioned in the first aperture 42 and/or extends at least partially through the first aperture 42, and the housing 14 is at least partially concealed in the space between the first and second sides 43 and 45. Additionally, as shown in part in FIGS. 4C and 4D, the cap 16 may cover at least a portion (e.g., at least 25%, at least 50%, at least 75%, or 100%) of the first aperture collar 44 when the plunger 12 is depressed to contact the cap 16 with the first aperture collar 44.

Figure 4D:
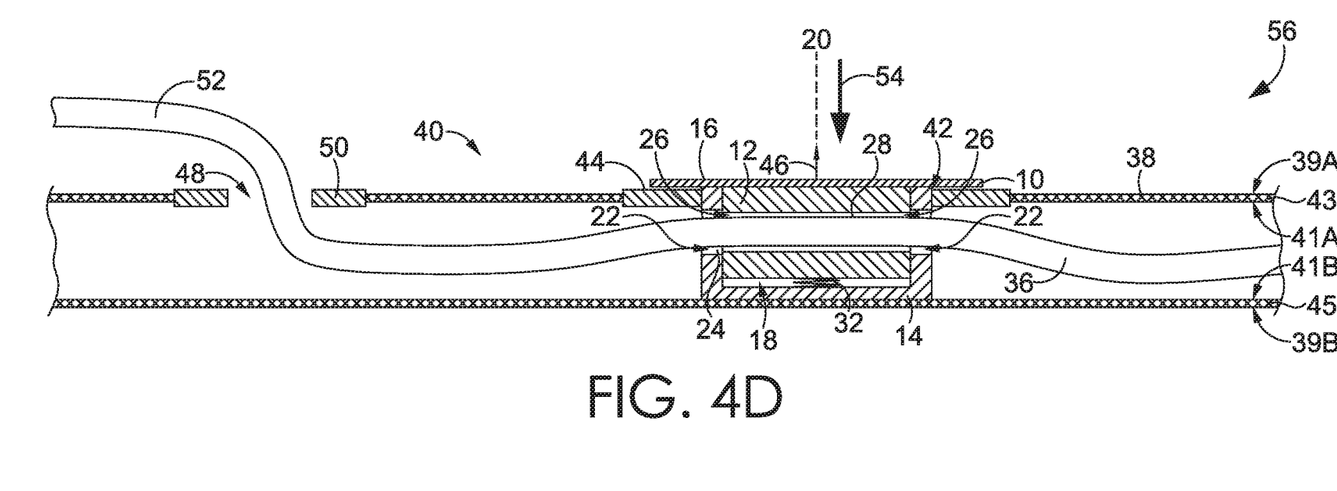
FIG. 4D depicts the cord-lock assembly of FIG. 4C with a force applied, in accordance with an aspect hereof.

Referring to FIG. 4D, the cord-lock assembly 56 of FIG. 4C, with the force 54 applied to the cord lock 10, is provided, in accordance with an aspect hereof. In FIG. 4D, the force 54 is applied to the plunger 12, and the force 54 is applied in a direction that aligns with the axes 20 and 46. The force 54 counteracts the force of the biasing element 32 and moves the plunger 12 towards the housing 14, at least partially aligning the first and second through-channels 24, 28, reducing restriction on the cord 36. As a result, the cord 36 may more easily be slidably adjusted through the cord lock 10, allowing a user to adjust the length 52 of the cord 36 extending through the second aperture 48.

Figure 4E:
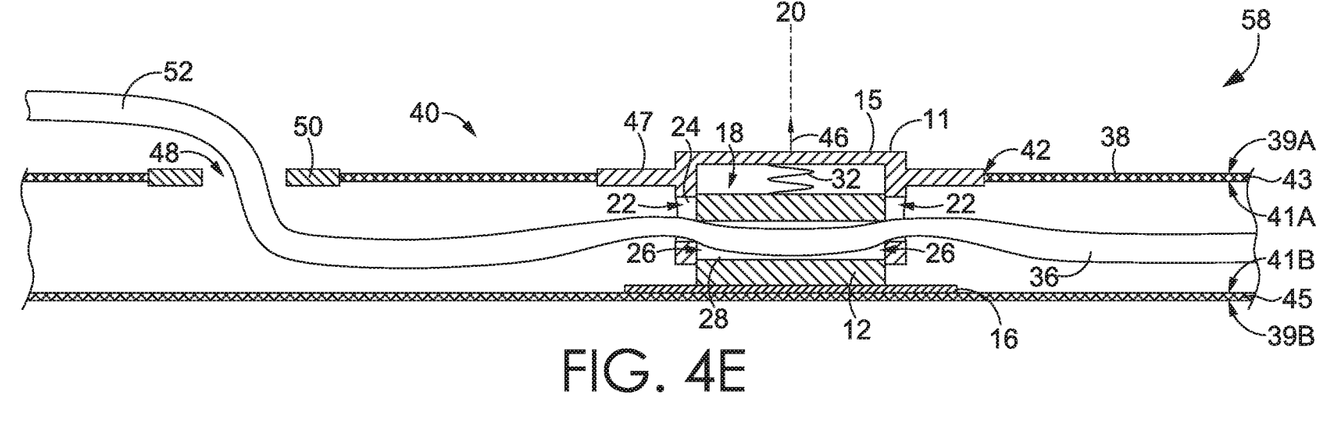
FIG. 4E depicts a cross-section view of another alternative cord-lock assembly configuration, in accordance with an aspect hereof.

Referring to FIG. 4E, a cross-section view of another alternative cord-lock assembly 58 is provided, in accordance with an aspect hereof. The assembly 58 of FIG. 4E includes a cord lock 11 having the plunger 12, and also, a housing 15 of a different design than the housing 14 shown in FIGS. 4A-4D. The cord lock 11 is once again incorporated into the article layer 38, with the housing 15 positioned in the first aperture 42. However, in contrast to the assemblies 34, 56 shown in FIGS. 4A-4D, the housing 15 is formed integrally with an aperture collar 47 that extends around a perimeter of the first aperture 42. As a result, the housing 15 and the aperture collar 47 are formed of a unified construction, rather than being separate components.

Figure 4F:
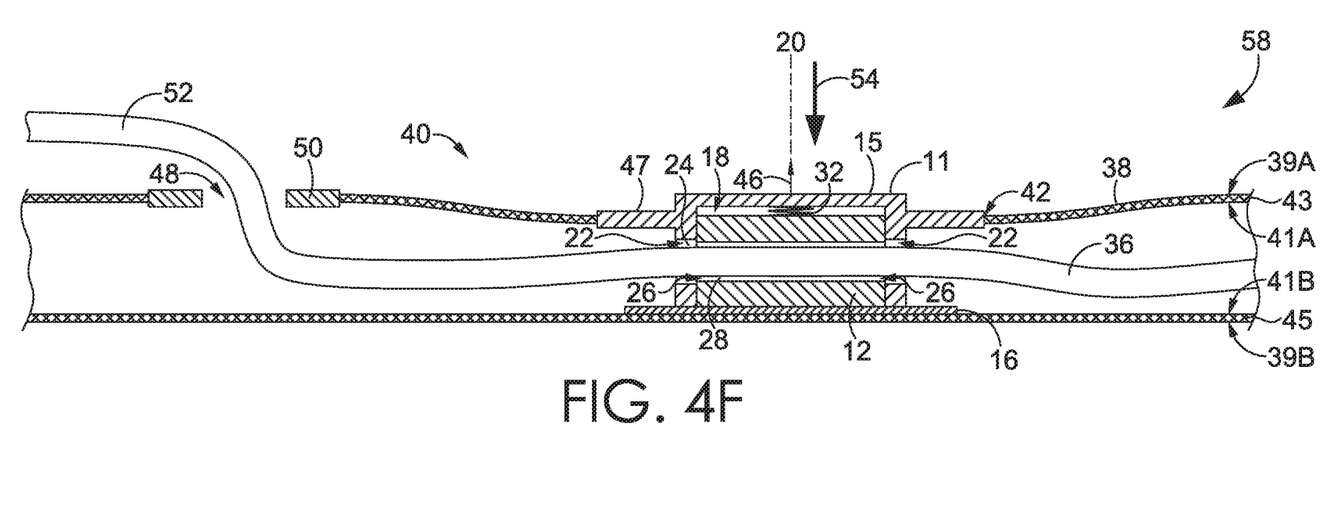
FIG. 4F depicts the cord-lock assembly of FIG. 4E with a force applied, in accordance with an aspect hereof.

Referring to FIG. 4F, the cord-lock assembly 58 of FIG. 4E, with the force 54 applied to the cord lock 11, is provided, in accordance with an aspect hereof. Once again, FIG. 4F depicts how when the force 54 is applied in a direction that aligns with the axes 20 and 46, the force 54 counteracts the force of the biasing element 32, moving the first and second through-channels 24, 28 towards alignment, reducing restriction on the cord 36 and allowing slidable adjustment of the cord 36 through the cord lock 11. Because the housing 15 and the aperture collar 47 are integrally formed with each other, when the force 54 is applied, the aperture collar 47 moves with the housing 15 relative to the plunger 12, and also, moves at least a portion of the first side 43 towards the second side 45.

Figure 5:
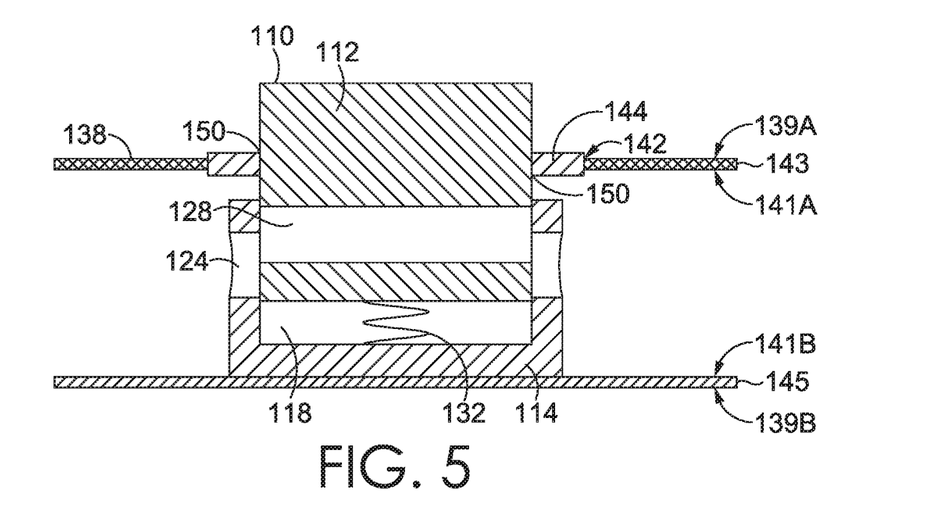
FIG. 5 depicts a cross-section view of a configuration by which a cord lock (such as the cord locks in FIGS. 1-4F) might be integrated into an article layer, in accordance with an aspect hereof.
Figure 6:
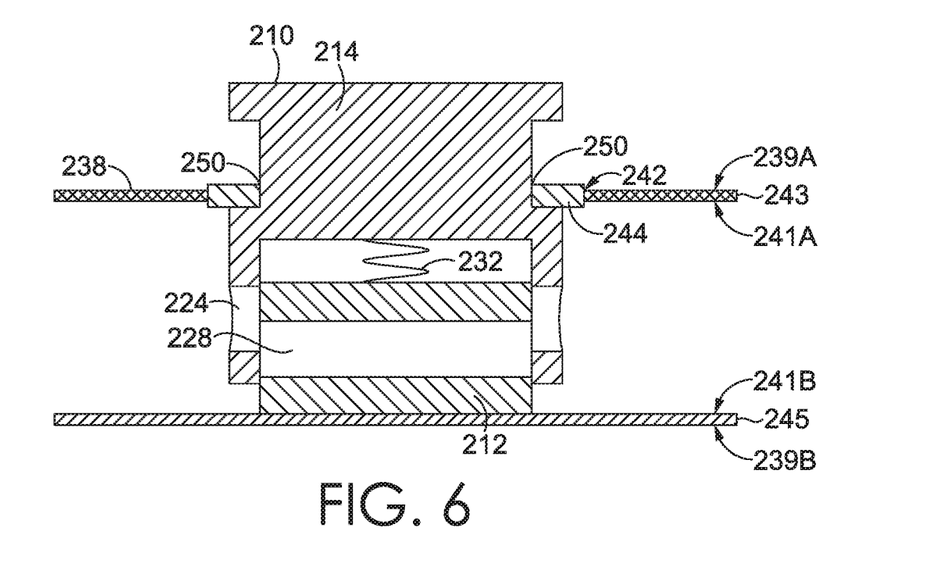
FIG. 6 depicts a cross-section view of another configuration by which a cord lock (such as the cord locks in FIGS. 1-4F) might be integrated into an article layer, in accordance with an aspect hereof.

Referring now to FIGS. 5 and 6, cross-section views are depicted of configurations by which a cord lock (such as the cord locks in FIGS. 1-4F) might be integrated into, and coupled with, an article layer. FIGS. 5 and 6 depict exemplary cord locks 110 and 210, respectively, but the configurations depicted (and described below) may also be applied to and combined with the subject matter of FIGS. 1-4F. Cord locks 110, 210 depict how different portions of a cord lock may be positioned in and/or extend at least partially through an aperture, and may be coupled to an aperture collar at various locations. For example, in the configuration of the cord lock 110, the plunger 112 is positioned through, and possibly coupled with, an aperture collar. In contrast, in the configuration of the cord lock 210, the housing 214 is positioned through, and possibly coupled with, an aperture collar.

Referring to FIG. 5, a cross-section view of an exemplary cord lock 110 integrated into an article layer 138 is provided, in accordance with an aspect hereof. The cord lock 110 shown in FIG. 5 includes a plunger 112, a housing 114 forming a plunger-receiving space 118, a biasing element 132, a first through-channel 124, and a second through-channel 128. The cord lock 110 in FIG. 5 is shown with the plunger 112 positioned in a first aperture 142 of the article layer 138 when the cord lock 110 is in a resting state, with no force applied against the biasing element 132.

The article layer 138 includes a first side 143 with an inward-facing surface 141A and an outward-facing surface 139A, and a second side 145 with an inward-facing surface 141B and an outward-facing surface 139B. The cord lock 110 is coupled between the first side 143 and the second side 145, such that the cord lock 110 is at least partially in the space enclosed between the inward-facing surfaces 141A and 141B. The plunger 112 is seated in the housing 114 in the partially enclosed space (such that they are obscured at least partially within the article layer 138). The plunger 112 extends through the first aperture 142. The first aperture 142 includes a first aperture collar 144 that forms a perimeter around the first aperture 142, circumscribing the plunger 112. In this respect, the plunger 112 is coupled to the first aperture collar 144 at a coupling 150. The coupling 150 may be a movable, slidable, or fixed coupling, and may be at any location along the side of the plunger 112, in various aspects. As previously indicated, the coupling 150 might be used in combination with any of the subject matter described with respect to FIGS. 1-4F.

Referring to FIG. 6, a cross-section view of another exemplary cord lock 210 integrated into an article layer 238 is provided, in accordance with an aspect hereof. The cord lock 210 in FIG. 6 includes a plunger 212, a housing 214 forming a plunger-receiving space 218, a biasing element 232, a first through-channel 224, and a second through-channel 228. The cord lock 210 in FIG. 6 is shown with the housing 214 positioned in a first aperture 242 of the article layer 238 while the cord lock 210 is in a resting state without a force applied against the biasing element 232. The article layer 238 includes a first side 243 with an inward-facing surface 241A and an outward-facing surface 239A, and a second side 245 with an inward-facing surface 241B and an outward-facing surface 239B. The cord lock 210 is coupled between the first side 243 and the second side 245, such that the cord lock 210 is at least partially in the space enclosed between the inward-facing surfaces 241A and 241B. The housing 214 is coupled to a first aperture collar 244 that forms a perimeter around the first aperture 242. The housing 214 and the first aperture collar 244 are joined at a coupling 250, which may be a movable, slidable, or fixed coupling. As previously indicated, the coupling 250 might be used in combination with any of the subject matter described with respect to FIGS. 1-4F.

Figure 7A:
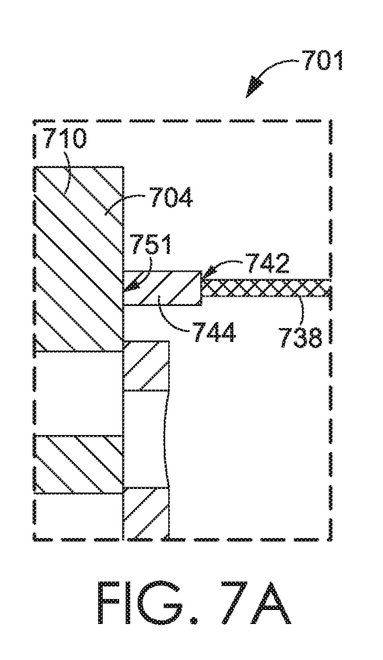
FIGS. 7A-7C depict a variety of exemplary couplings between an article layer and a cord lock, in accordance with aspects hereof.
Figure 7B:
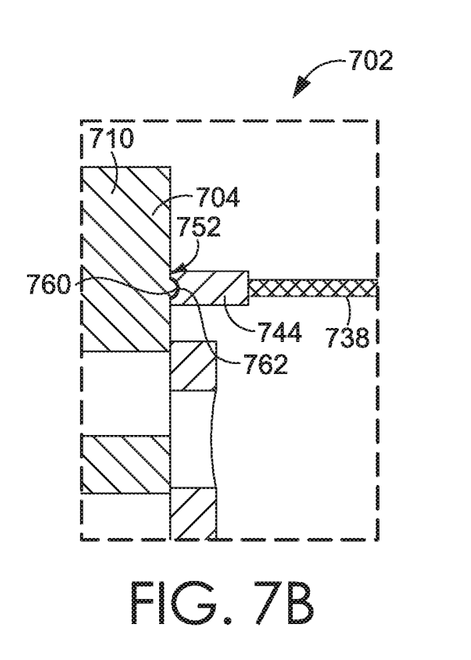
Figure 7C:
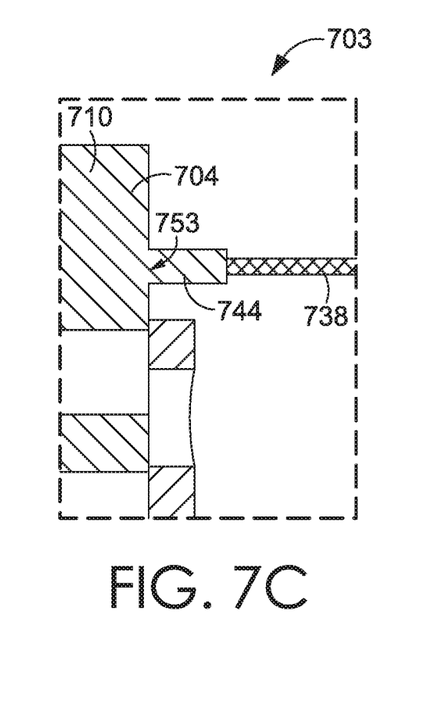

Referring to FIGS. 7A-7C, a variety of exemplary coupling configurations 701, 702, 703 for cord-lock assemblies are shown, and the coupling configurations might be utilized in the context of couplings 150 and 250. Referring to FIG. 7A, a first coupling configuration 701 is provided, in accordance with an aspect hereof. In FIG. 7A, a cord lock 710 is shown coupled to an article layer 738 with a first coupling 751. The article layer 738 includes an aperture 742 including an aperture collar 744 that forms a perimeter around the aperture 742. A portion 704 of the cord lock 710 (e.g., a plunger that is movable relative to a housing) is positioned in the aperture 742 and is coupled to the aperture collar 744 with the first coupling 751. The first coupling 751 may slidably, moveably, or fixedly couple the portion 704 of the cord lock 710 to the aperture collar 744. The aperture collar 744 may also comprise a grommet coupled to the article layer 738 and to the portion 704 of the cord lock 710. The first coupling 751 may utilize adhesive, natural or synthetic bonding (e.g., a bonding agent), friction, thermal or ultrasonic welding, and the like to couple the portion 704 to the aperture collar 744 and/or retain the portion 704 in the first aperture 742.

Referring to FIG. 7B, a second coupling configuration 702 is provided, in accordance with an aspect hereof. In FIG. 7B, the cord lock 710 of FIG. 7A is shown coupled to the aperture collar 744 with a second coupling 752. The second coupling 752 includes a male-female configuration having a radially extending lip 760 that catches or engages with an inner radial edge 762 of the aperture collar 744 to secure the portion 704 of the cord lock 710 to the aperture collar 744, allowing the cord lock 710 to remain coupled or attached to the aperture collar 744 and the article layer 738. The second coupling 752 may also be formed with additional joining methods, such as adhesive, bonding, welding, and the like, for extra securement.

Referring to FIG. 7C, a third coupling configuration 703 is provided, in accordance with an aspect hereof. In FIG. 7C, the cord lock 710 of FIGS. 7A-7B is shown coupled to the aperture collar 744 with a third coupling 753. The third coupling 753 comprises the portion 704 of the cord lock 710 being integrally formed with the aperture collar 744 to form a unified construction. Once again, the aperture collar 744 may be a grommet, which may be coupled to the article layer 738 and to the cord lock 710, as shown in FIG. 7C.

Figure 8:
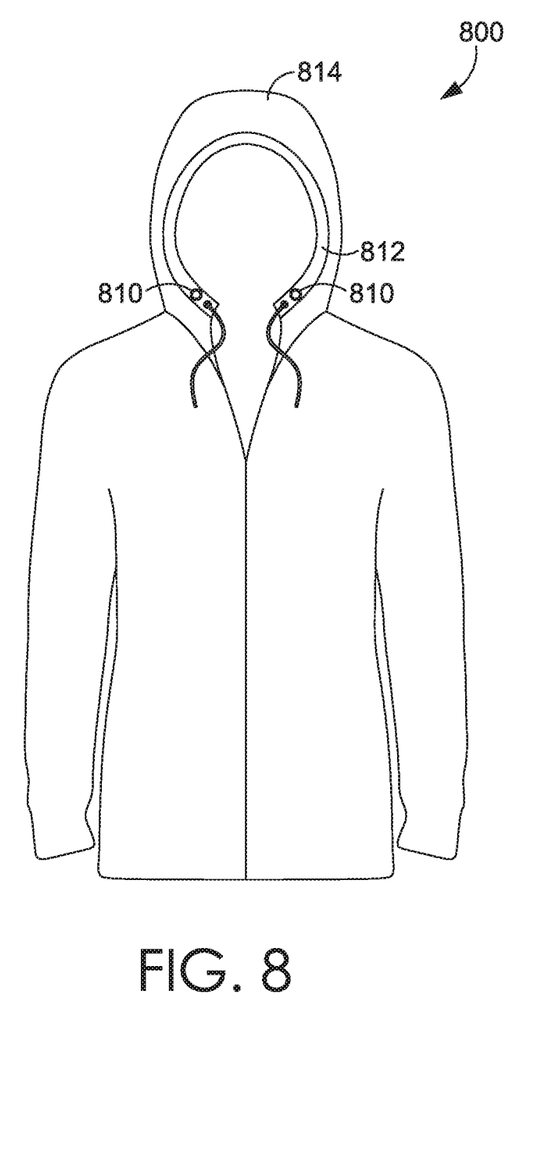
FIG. 8 depicts an exemplary upper body article with cord-lock assemblies integrated into a portion of a hood of the article, in accordance with an aspect hereof.

Referring to FIG. 8, an exemplary upper body article 800 with cord-lock assemblies 810 integrated therein is provided, in accordance with an aspect hereof. The cord-lock assemblies 810 shown in FIG. 8 may be similar to one of the cord-lock assemblies described herein, such as the cord-lock assembly 34 shown in FIGS. 4A-4B. The cord-lock assemblies 810 in the aspect shown in FIG. 8 are formed within a tubular encasing 812 of a hood portion 814 of the article 800. The article 800 may be a shirt, pullover, jacket, hooded jacket, outer layer, base layer, and the like. Additional cord-lock assemblies 810 may be incorporated at other locations on the article 800 as well, such as at a waist opening or at pockets.

Figure 9:
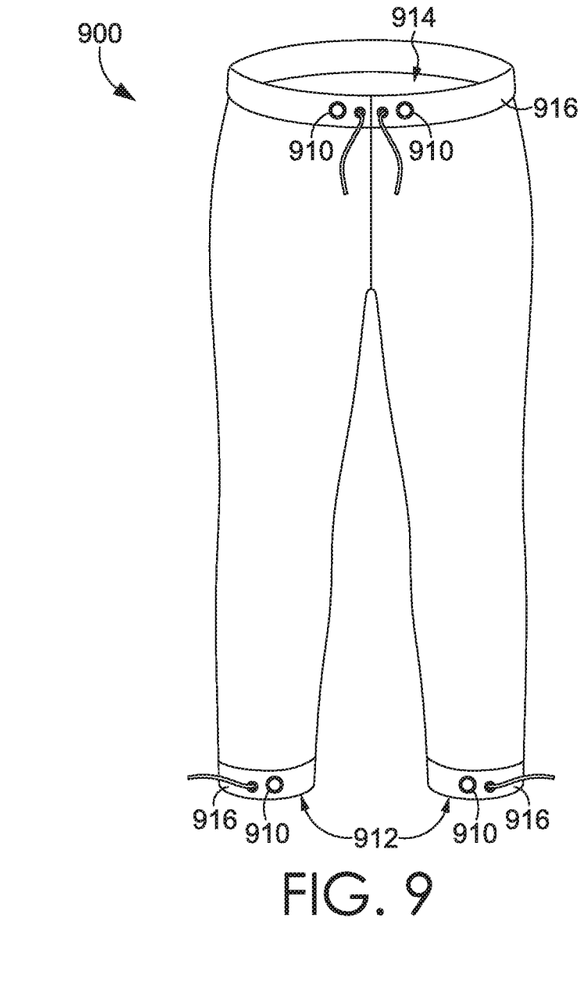
FIG. 9 depicts an exemplary lower body article with cord-lock assemblies integrated at waist and leg openings of the article, in accordance with an aspect hereof.

Referring to FIG. 9, an exemplary lower body garment 900 with multiple cord-lock assemblies 910 integrated therein is provided, in accordance with an aspect hereof. The cord-lock assemblies 910 may be one of the cord-lock assemblies described herein, such as the cord-lock assembly 34 shown in FIGS. 4A-4B. The lower body garment 900 may be a pair of pants, shorts, ¾ lengths, capris, and the like. As shown in the aspect in FIG. 9, the lower body garment 900 includes the cord-lock assemblies 910 integrated at leg cuffs 912 and at a waistband 914, and other locations are contemplated, as well. Additionally, the cord-lock assemblies 910 are shown integrated within tubular encasings 916 at the leg cuffs 912 and the waistband 914.

Figure 10:
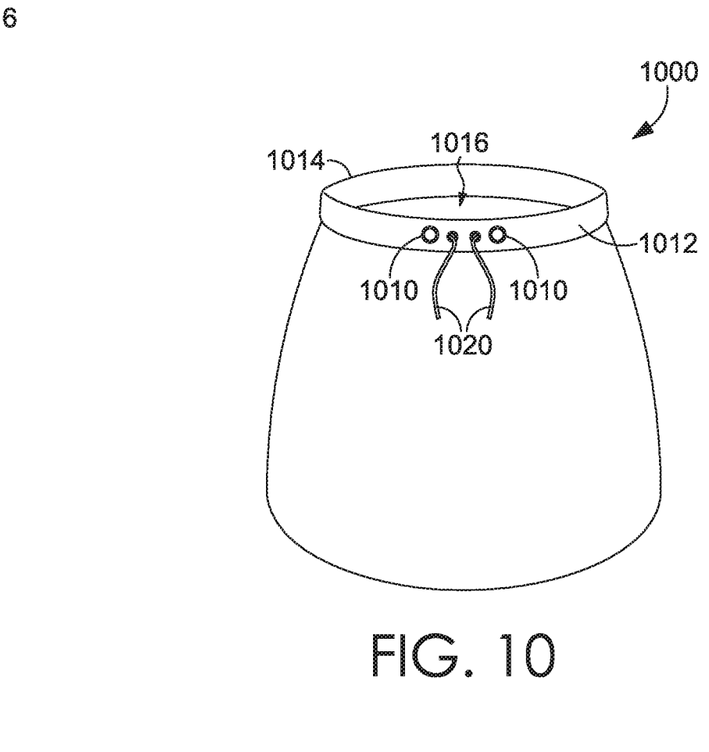
FIG. 10 depicts an exemplary bag with cord-lock assemblies integrated into a collar around an opening of the bag, in accordance with an aspect hereof.

Referring to FIG. 10, an exemplary bag 1000 with cord-lock assemblies 1010 integrated therein is provided, in accordance with an aspect hereof. The cord-lock assemblies 1010 may be one of the cord-lock assemblies described herein, such as the cord-lock assembly 34 shown in FIGS. 4A-4B. The bag 1000 may be any one of a number of bags, such as a backpack, track bag, duffel, sleeping bag, shoulder bag, swim bag, or other equipment bag. Additionally, the bag 1000 includes a tubular encasing 1012 that forms a collar 1014 around an opening 1016 into an interior compartment of the bag 1000. The cord-lock assemblies 1010 may be integrated into the tubular encasing 1012 as described herein, and may be used to reduce or restrict the size of the opening 1016 by adjusting a length of cord 1020 exposed from the tubular encasing 1012.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made of the invention without departing from the scope thereof, it is to be understood that all matter herein set forth or shown in the accompanying drawings is to be interpreted as illustrative and non-limiting.

What is claimed is:
1. A cord-lock assembly, comprising:
   a cord lock having a first portion, a second portion, and a biasing element coupled between the first portion and the second portion,
   the first portion including a first through-channel,
   the second portion including a second through-channel that is alignable with the first through-channel, and
   the biasing element providing a force in a first direction to misalign the first through-channel and the second through-channel; and
   an article layer having a first aperture, the first aperture bounded by an aperture collar that forms a perimeter around the first aperture,
   wherein at least part of the first portion is positioned in the first aperture and is circumscribed by the aperture collar,
   wherein the first direction of the force is axially aligned with the first aperture, wherein the article layer forms a tubular encasing that at least partially encloses a space,
   wherein the first portion is seated in the second portion within the space,
   wherein the first portion extends in the first direction through the first aperture to a position that is external from the space, and wherein the aperture collar includes a grommet that is fixedly coupled to the perimeter around the first aperture.

2. The assembly of claim 1, wherein the first portion includes a housing having one or more sidewalls at least partially enclosing a plunger-receiving space, the one or more sidewalls including the first through-channel, and wherein the second portion includes a plunger having the second through-channel that is alignable with the first through-channel when the plunger is at least partially received in the plunger-receiving space.

3. The assembly of claim 1, wherein the second portion includes a housing having one or more sidewalls at least partially enclosing a plunger-receiving space, the one or more sidewalls including the first through-channel, and wherein the first portion includes a plunger having the second through-channel that is alignable with the first through-channel when the plunger is at least partially received in the plunger-receiving space.

4. The assembly of claim 1, wherein the grommet engages the first portion of the cord lock by frictional engagement.

5. The assembly of claim 1, wherein the first portion includes a radially extending lip that catches an inner radial edge of the grommet to couple the first portion to the grommet.

6. The assembly of claim 1, wherein the first portion is integrally formed with the grommet.

7. The assembly of claim 1, wherein the assembly further comprises a cap fixedly coupled to the first portion, and wherein the article layer is secured between the cap and the first portion.

8. The assembly of claim 1, further comprising a second aperture in the article layer, and a cord threaded through the first and the second through-channels and extending through the second aperture.

9. The cord-lock assembly of claim 1, wherein the article layer forms part of an article of apparel.

10. The cord-lock assembly of claim 1, wherein the article layer forms part of a bag.

11. The cord-lock assembly of claim 1, wherein the article layer forms part of a hooded jacket.

12. A cord-lock system comprising:
a cord lock including:
a housing having one or more sidewalls at least partially enclosing a plunger-receiving space, the one or more sidewalls including a first through- channel;
a plunger having a second through-channel that is alignable with the first through-channel when the plunger is at least partially received in the plunger- receiving space;
a biasing element coupled between the housing and the plunger, the biasing element providing a force in a first direction to misalign the first through-channel and the second through-channel; and
an article layer having an aperture bounded by an aperture collar, the aperture collar forming a perimeter around the aperture,
wherein the plunger and the aperture collar together comprise a single unified component,
wherein the first direction of the force is axially aligned with the aperture,
wherein the article layer forms a tubular encasing that at least partially encloses a space,
wherein the plunger is seated in the housing within the space, and
wherein the plunger extends in the first direction through the aperture to a position that is external from the space.

13. The cord-lock system of claim 12, wherein the article layer forms part of an article of apparel.

14. The cord-lock system of claim 12, wherein the article layer forms part of a bag.

15. The cord-lock system of claim 12, wherein the article layer forms part of a hooded jacket.

16. An article, comprising:
an article layer forming a tubular encasing that at least partially encloses a space, the article layer having a first aperture and a second aperture, the first aperture bounded by an aperture collar that forms a perimeter around the first aperture;
a cord lock at least partially enclosed within the space, the cord lock including a first portion at least partially extending through the first aperture, a second portion, and a biasing element coupled between the first portion and the second portion,
the first portion including a first through-channel, the second portion including a second through-channel that is alignable with the first through-channel, and the biasing element providing a force in a first direction to misalign the first through-channel and the second through-channel,
wherein the first direction is axially aligned with the first aperture,
wherein the first portion is seated in the second portion in the space,
wherein the first portion extends in the first direction through the first aperture to a position that is external to the space,
wherein the aperture collar includes a grommet that is fixedly coupled to the perimeter around the first aperture, or
wherein the first portion and the aperture collar together comprise a single unified component; and
a cord positioned through the first through-channel, the second through-channel, and the second aperture.

17. The article of claim 16, wherein a length of the cord is adjustable when a counteracting force is applied in a second direction that is opposite to the first direction and that is axially aligned with the first aperture.

18. The article of claim 16, wherein the article is a hooded jacket, and wherein the tubular encasing is at least a portion of a hood of the hooded jacket.

19. The article of claim 16, wherein the article is a lower-body garment and the tubular encasing forms at least a portion of a leg cuff or a waistband of the lower-body garment.

20. The article of claim 16, wherein the article is a bag and the tubular encasing forms a collar around an opening to a compartment of the bag.

* * * * *